United States Patent [19]

Schützner

[11] Patent Number: 5,217,210
[45] Date of Patent: Jun. 8, 1993

[54] MOTOR VEHICLE SPRING SUPPORT SYSTEM WITH COMPUTER-ASSISTED CONTROL

[75] Inventor: Paul Schützner, Esslingen, Fed. Rep. of Germany

[73] Assignee: Mercedes-Benz AG, Fed. Rep. of Germany

[21] Appl. No.: 781,740

[22] Filed: Oct. 23, 1991

[30] Foreign Application Priority Data

Oct. 24, 1990 [DE] Fed. Rep. of Germany ....... 4033781

[51] Int. Cl.⁵ .................. B60G 17/08; F16F 15/04
[52] U.S. Cl. .................. 267/64.16; 267/64.22
[58] Field of Search .............. 267/64.15, 64.16, 64.22, 267/64.18; 188/280, 285, 299, 281

[56] References Cited

U.S. PATENT DOCUMENTS

| | | | |
|---|---|---|---|
| 4,004,762 | 1/1977 | Jenkins | 267/64.22 |
| 4,597,548 | 7/1986 | Bergloff et al. | 267/64.22 |
| 4,639,013 | 1/1987 | Williams et al. | 267/64.16 |
| 4,655,440 | 4/1987 | Eckert | 267/64.16 |
| 4,702,490 | 10/1987 | Yamaguchi et al. | 267/64.16 |
| 4,796,873 | 1/1989 | Schubert | 267/64.16 |

FOREIGN PATENT DOCUMENTS

| | | |
|---|---|---|
| 1021732 | 12/1957 | Fed. Rep. of Germany . |
| 2200356 | 7/1973 | Fed. Rep. of Germany . |
| 3233160 | 3/1984 | Fed. Rep. of Germany . |
| 3504217 | 8/1985 | Fed. Rep. of Germany . |

Primary Examiner—Matthew C. Graham
Attorney, Agent, or Firm—Evenson, McKeown, Edwards & Lenahan

[57] ABSTRACT

A system has pneumatic or hydropneumatic spring elements which are constructed in the form of displacement units and which are configured with a first pneumatic chamber, the volume of which changes according to the respective spring stroke, and a second pneumatic chamber having a constant volume. The two chambers can be connected to and isolated from one another by a valve arrangement. An appropriate control of the valve arrangement makes it possible to ensure that, in the reversal phase between the compression stage and extension stage of each of the spring elements, marked changes of the supporting forces occur and counteract vibrations of the sprung mass.

19 Claims, 2 Drawing Sheets

MOTOR VEHICLE SPRING SUPPORT SYSTEM WITH COMPUTER-ASSISTED CONTROL

BACKGROUND AND SUMMARY OF THE INVENTION

The present invention relates to a sprung support system, especially for motor vehicles, with pneumatic or hydropneumatic spring elements which are arranged between a sprung mass, e.g., a vehicle body, and a non-sprung mass, e.g., a wheel or axle, and which are constructed in the form of displacement units which possess a first pneumatic chamber whose volume changes according to the respective spring stroke and a second, constant-volume pneumatic chamber which can be connected to and isolated from the first chamber by a valve arrangement controllable as a function of the stroke position of the respective spring element.

A known support system for motor vehicles is shown in DE-B-1,021,732 where a pneumatic concertina arranged between the vehicle body and an axle is connected constantly to a first pneumatic chamber arranged on the vehicle body and is itself coupled, via a line controllable by a rotary slide valve, to a second pneumatic chamber arranged on the body. The rotary slide valve is controlled by a linkage associated between a lever actuating the valve and the associated vehicle axle. As soon as the axle reaches a comparatively highly-compressed or highly-extended position in relation to the vehicle body, the rotary slide valve is closed completely by the linkage, with the result that the second pneumatic chamber is isolated from the first pneumatic chamber and only a correspondingly reduced pneumatic volume between the vehicle body and wheel axle still takes effect. A markedly progressive spring behavior is obtained in this way.

A functionally similar support system is known from DE-A-2,200,356 which achieves an even more progressive spring behavior. Here a pneumatic concertina arranged between a wheel axle and the vehicle body can be isolated from a pneumatic chamber located on the body as soon as the wheel axle moves sufficiently far from a middle position relative to the vehicle body in the compression or the extension direction. At the same time, the axle moving relative to the vehicle body additionally actuates a pneumatic valve, such that, when the wheel axle comes extremely close to the vehicle body, the pneumatic chamber located on the body is subjected to additional pneumatic medium from a pneumatic pressure source, or pneumatic medium is bled from the pneumatic concertina as soon as the wheel axle is moved relative to the vehicle body comparatively far in the extension direction. The pressure rise obtainable thereby in the pneumatic chamber during an extreme compression movement of the wheel axle and the pressure reduction taking place in the pneumatic concertina during an extreme extension movement can have the result that the valve arrangement, which is closed in these operating states, between the pneumatic concertina and pneumatic chamber opens as a result of the pressure difference between the pneumatic chamber and pneumatic concertina. To accomplish this action, the closing members of the valve arrangement are configured as non-return valves.

EP-A-0,166,702 shows a further support system, in which the spring elements are pure pneumatic units, each with two chambers. One of the chambers changes its volume according to the respective spring stroke, while the volume of the other chamber remains constant. A valve arrangement is also located between the chambers so that, with the valve arrangement open, the support system works at a comparatively low spring rate. In other words, in the compression stage of the spring element (the total volume of the two chambers decreases as a result of the spring stroke), the supporting force increases only comparatively slowly; in the extension stage (the total volume of the two chambers increases as a result of the spring stroke), the supporting force decreases only comparatively slowly. This action occurs because the ratio between the change in volume of the two chambers during a spring stroke and the total volume of the two chambers have comparatively low values. In contrast, when the valve arrangement is closed, a comparatively high spring rate is obtained, i.e. the supporting forces increase relatively sharply in the compression stage, while they decrease correspondingly sharply in the extension stage. This action occurs because, during the closing of the connection between the two chambers, only the pneumatic medium of one chamber determines the spring behavior, and the ratio between the change in volume during a spring stroke and the volume of this chamber assumes comparatively high values.

Thus, a changeover between hard and soft springing can be obtained by switching the valve arrangement. This changeover takes place under parameter control for the spring support system according to EP-A-0,166,702, especially as a function of the transverse acceleration of a vehicle. The system of EP-A-0,166,702 also ensures, if appropriate that, in the closing state of the valve arrangement, the two chambers of the pneumatic unit still remain connected via throttle stages or throttle valves and an exchange of pneumatic medium takes place between the chambers as soon as a sufficient pressure difference takes effect. In this way, on one hand, an effective damping of the spring strokes can be achieved; on the other hand, the spring rate of the pneumatic unit changes to a less pronounced extent during the opening and closing of the valve arrangement between the two chambers.

A similar sprung support system for motor vehicles is shown in German Offenlegungsschrift 3,233,160. Once again, pneumatic units, each with two chambers, are provided as spring elements between the vehicle wheels and the vehicle body. One of the chamber changes its volume according to the spring stroke, while the volume of the other chamber remains constant. The valve arrangement between the two chambers and normally assuming its open position is controlled in an axle-related manner, specifically in such a way that a changeover into the closed position takes place when pronounced pressure differences occur between the pneumatic pressures of the pneumatic units assigned to a vehicle axle. In this way, an effect similar to that obtained with conventional transverse stabilizers can be achieved in vehicles, i.e. swaying or rolling movements of the vehicle body are counteracted by a higher spring rate.

Moreover, it is generally known for pneumatic spring units, for example from German Offenlegungsschrift 3,504,217, to assign a chamber of constant volume to the chamber varying its volume during spring strokes and to arrange a randomly actuable changeover valve between these two chambers, so that a changeover between two different spring rates can be carried out.

An object of the present invention is to improve a sprung support system so that undesirable resonant vibrations, especially vibrations of the vehicle body at the so-called body resonant frequency on motor vehicles, are counteracted to a greater extent.

This object has been achieved in accordance with the present invention by providing that the valve arrangement can be changed over between an open position and a closed position at every reversal of stroke direction by a computer-assisted control which determines from the signals of a stroke transmitter arranged between the sprung mass and non-sprung mass not only the respective stroke position, but also the stroke speed and stroke direction.

It is therefore a feature of the present invention that the supporting forces of a spring element can be varied very sharply during a reversal of the direction of movement, in that the valve arrangement can be changed over at the reversal of stroke direction. The result is that the respective vibrations are counteracted to an especially pronounced extent because the change of the supporting forces takes place in phase opposition to the vibratory movements.

For example, if the valve arrangement is closed in the compression stage of the pneumatic spring element before the reversal point of the direction of movement is reached and is opened again at the reversal of the direction of movement (i.e. at the start of the extension stage), the supporting forces increase sharply before the reversal point is reached, while subsequently a pronounced reduction of the supporting force takes place during the changeover of the valve arrangement. This occurs because, in the compression stage with the valve arrangement closed, the pneumatic pressure in the variable-volume chamber of the spring element increases sharply, and a high pressure difference simultaneously occurs between the two chambers. Now, when the valve arrangement is opened at the start of the subsequent extension stage, pneumatic medium flows over from the variable-volume chamber which is under high pressure into the other constant-volume chamber which is under comparatively low pressure. That is, a pronounced reduction in the supporting forces is already taking place in the reversal phase between the opposite directions of movement.

The same applies accordingly, but with an opposite sign, when, in the extension stage of the pneumatic spring element, the valve arrangement is closed before the reversal point between the extension and compression stages is reached and is opened after the reversal of the direction of movement, i.e. at the start of the compression stage. The pneumatic pressure in the variable-volume chamber falls sharply during the final phase of the extension stage because the valve arrangement is closed, and considerable underpressure can occur in relation to the pressure in the constant-volume chamber. When the valve arrangement is opened at the reversal of the direction of movement, however, pneumatic medium flows out of the constant-volume chamber into the variable-volume chamber which is under comparative underpressure, that is to say the supporting forces sharply reduced in the final phase of the extension stage are already markedly increased in the reversal phase between the directions of movement. A movement of the body in relation to the road can be counteracted especially effectively in this manner. In particular, vibrations of the body at the so-called body resonant frequency can be controlled and damped especially effectively.

The relatively high-frequency spring movements of the wheels occurring virtually continuously as the result of road unevenness can, if appropriate, be utilized to vary the height of the vehicle body in relation to the road. For example, if the ground clearance of the vehicle body on one wheel is to be increased, the connection between the variable-volume chamber and the constant-volume chamber of the associated spring unit is kept closed and is opened only when, during a downward movement of the respective wheel relative to the body, an underpressure in relation to the pressure of the constant-volume chamber occurs in the variable-volume chamber. During the subsequent upward stroke of the wheel or during the passage of the reversal point of the wheel movement before the subsequent upward stroke, the connection is then closed again. In this way, the variable-volume chamber can be pumped full of pneumatic medium, until the pressure in the constant-volume chamber has fallen so far that the pressure in the variable-volume chamber, varying as a result of the spring movements, no longer falls below the value of the pressure in the constant-volume chamber in the extension stage of the spring movements.

The present invention also provides for reduction of the ground clearance of the vehicle body in a similar way. In this case, the connection between the constant-volume chamber and the variable-volume chamber is opened during the upward stroke of the wheel in relation to the vehicle body, i.e. in the compression stage, as soon as an overpressure occurs in the variable-volume chamber in relation to the constant-volume chamber. During the subsequent downward stroke of the wheel or the extension stage, the connection is closed. In this manner, the constant-volume chamber can be pumped full of pressure, until the pressure peaks in the variable-volume chamber, occurring in the compression stage of the wheel movements, no longer exceed the pressure in the constant-volume chamber.

A particular advantage of the present invention is that the changeover of the valve arrangement to the vibration-related uncoupling of the sprung mass, the vehicle body where a motor vehicle is concerned, remains very largely unchanged in respect of relatively high-frequency vibrations, such as occur in a motor vehicle, for example, on rough road surfaces. The variation of the spring rate by a changeover of the valve arrangement mainly has an effect on low-frequency vibrations, namely the comparatively slow body vibrations of a motor vehicle.

BRIEF DESCRIPTION OF THE DRAWINGS

These and other objects, features and advantages of the present invention will become more readily apparent from the following detailed description of currently preferred embodiments when taken in conjunction with the accompanying drawings wherein.

DETAILED DESCRIPTION OF THE DRAWINGS

Figure 1:
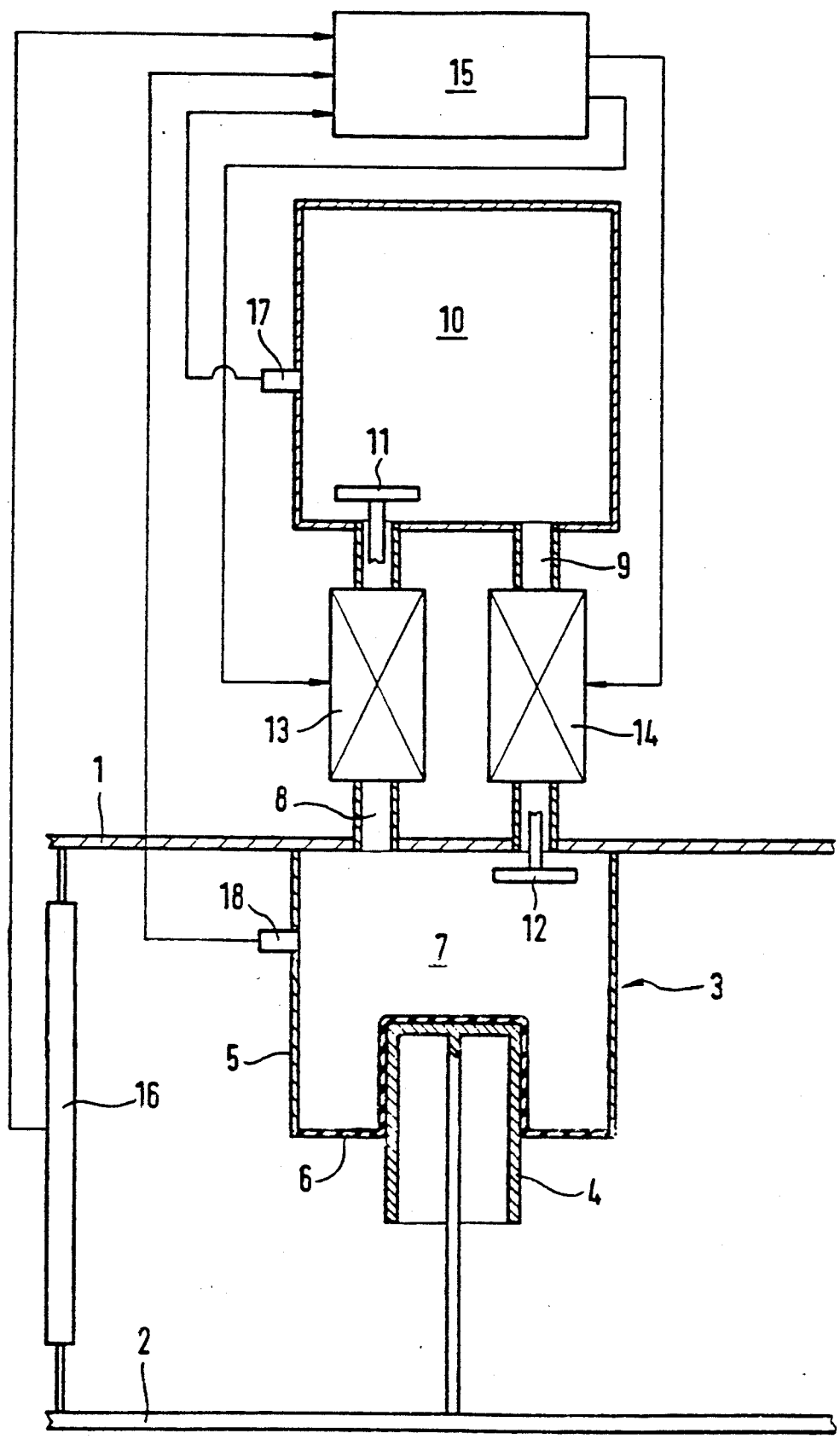
FIG. 1 is a schematic elevational view of a first embodiment of the support system according to the present invention.

FIG. 1 shows a vehicle body 1 (a sprung mass), of which only the underside is shown schematically in cutout form and on which vehicles axles 2 (non-sprung mass), of which only one is also represented schematically in cutout form, are supported in a basically known way by pneumatic-spring units 3.

The pneumatic-spring units 3 are configured in the form of displacement units and possess a displacement piston 4 which is arranged on the axle 2 and which, depending on the spring stroke, penetrates to a greater or lesser extent into a housing 5 arranged on the body and closed off sealingly on the same side as the piston by a concertina 6 rolling on the displacement piston 4.

The chamber 7 formed within the housing 5 has a greater or lesser volume according to the stroke position of the piston 4 o according to the distance between the vehicle body and the respective axle 2.

The chamber 7 is connected via two lines 8 and 9 to a further chamber 10, the volume of which is constant. The lines 8, 9 are controlled by non-return valves 11, 12 arranged in series with respective proportional valves 13, 14 which can be controlled continuously between complete opening and complete closing and which correspondingly allow a more or less highly throttled connection between the two chambers 7, 10 in the flow direction permitted by the associated non-return valves 11 or 12.

The non-return valves 11, 12 are arranged in a direction opposite to one another, that is to say the non-return valve 11 can open (with the proportional valve 13 opened) only when a sufficient overpressure in relation to the chamber 10 is present in the variable-volume chamber 7. The non-return valve 12 opens (with the proportional valve 14 opened) only when a sufficient overpressure in relation to the chamber 7 prevails in the constant-volume chamber 10.

If appropriate, the non-return valves 11, 12 can have different capacities or ratings so that, for example, the non-return valve 11 can open even with comparatively small pressure differences between the chambers 7 and 10, whereas there must be a greater pressure difference between the chambers 7 and 10 for the non-return valve 12 to open.

The proportional valves 13 and 14 are controlled by a conventional computer-assisted control circuit 15 whose outputs drive the actuating members of the proportional valves 13, 14. The inputs to the control circuit 15 are connected to one or more stroke transmitters 16 arranged between the vehicle body 1 and the axles 2. The signals of the stroke transmitter(s) 16 represent the respective distance between the axle 2 of the particular adjacent wheel and the vehicle body 1. The computer assigned to the control circuit 15 can determine from the signals of the stroke transmitters 16 not only the respective stroke position, but also the stroke speed and the stroke direction. Furthermore, from the stroke transmitter signals, the computer can calculate the frequency of vibrations of the vehicle body 1. Further inputs of the control circuit 15 can be connected to pressure transmitters 17, 18 for determining the pressure in the respective chambers 7, 10.

The arrangement illustrated in FIG. 1 functions as now described. When, for example, the vehicle body 1 executes undesirable movements, especially in the region of the body resonant frequency, the proportional valve 13 is closed in the compression stage of the spring unit 3, i.e. during an upward movement of the displacement piston 4 in relation to the vehicle body 1. The result of this action is that, with an increase in upward movement of the piston 4 relative to the vehicle body, a sharply rising pressure occurs in the chamber 7, since the chamber 7 is closed off from the chamber 10 in the compression stage because the proportional valve 13 has been closed and, even with the proportional valve 14 opened as appropriate, the line 9 is shut off by the non-return valve 12. As soon as the upward movement of the wheel or of the piston 4 in relation to the vehicle body 1 reaches its reversal point, the proportional valve 13 is opened, so that some relief of pressure from the chamber 7 into the chamber 10 occurs, i.e. the sharp pressure rise which took place in the chamber 7 in the preceding compression stage of the spring unit 3 as a result of the shut-off of the chamber 7 from the chamber 10 is markedly reduced. This leads to markedly reduced restoring forces of the spring unit.

If this action is still not sufficient to eliminate undesirable movements of the vehicle body 1, the proportional valve 14 can be kept closed during the extension stage of the spring movement and can be opened when the reversal point between the extension stage and compression stage is reached. Since, even with the proportional valve 13 remaining open as appropriate, the line 8 is closed off by the non-return valve 11 at the latest as soon as pressure equality between the chambers 7 and 10 or a slight underpressure in the chamber 7 in relation to the chamber 10 is reached, during the further course of the extension stage a clear underpressure will be established in the chamber 7 which is now closed off from the chamber 10, that is to say the supporting forces of the spring unit 3 decrease sharply in the extension stage. Because the proportional valve 14 opens at the reversal point between the extension stage and compression stage, pneumatic medium then flows out of the chamber 10 to the chamber 7 at the start of the compression stage, so that during the passage of the reversal point between the extension and compression stages the supporting force of the spring unit 3 is markedly increased.

Altogether, therefore, the supporting forces of the spring unit can be so varied in phase opposition to the body movements that body movements are counteracted with particular effectiveness. Thus, for the elimination of body movements, in response to pronounced stroke movements a clear pressure rise occurs in the variable-volume chamber 7 during the transition from the extension stage to compression stage and a clear pressure fall occurs in the chamber 7 during the transition from the compression stage to the extension stage, with the result that the supporting forces are varied respectively in phase opposition to the body movements.

If appropriate, a change of the ground clearance of the vehicle body can also be obtained. The relatively high-frequency spring movements of the wheels, which occur virtually continuously during travel, can be utilized for this, specifically even when the vehicle body 1 executes no or no undesirable stroke movements in relation to the road. To achieve an increase of the ground clearance, the proportional valve 14 is opened in the extension stage of the spring unit 3, so that pneumatic medium flows out of the chamber 10 into the chamber 7 as soon as a corresponding pressure drop from the chamber 10 to the chamber 7 occurs in the extension stage as a result of the increase in volume of the chamber 7. In the subsequent compression stage, a return flow of the pneumatic medium into the chamber 10 is prevented, on the one hand, by the now closing non-return valve 12 and, on the other hand, by keeping the proportional valve 13 closed. In this way, pneumatic medium can be pumped out of the chamber 10 into the chamber 7, until the pressure reductions occurring in the chamber 7 in the extension stag of the spring unit 3 are no longer sufficient to produce a pressure drop from the chamber 10 to the chamber 7.

To obtain a reduction of the level of the vehicle body 1, the proportional valve 13 is opened, while the proportional valve 14 remains closed, at least during the extension stage of the spring unit 3. In this manner, pneumatic medium is pumped out of the chamber 7 into the chamber 10 during the compression stage of the spring unit 3, as soon as a sufficient overpressure in relation to the chamber 10 builds up in the chamber 7 as a result of the reduction in volume of the latter. A return flow of the pneumatic medium in the subsequent extension stage is then prevented by the closing non-return valve 11 and the closed proportional valve 14.

The above-described control operations are each characterized in that a changeover of the connection between the chambers 7 and 10 takes place at the reversal point of the movement of the piston 4 in relation to the vehicle body 1 such that a previously cleared connection is shut off or a previously opened connection closed off. A particular advantage of the present invention is that the proportional valves 13, 14 can be controlled virtually free of power, because the power requirement of the actuating members of these valves 13 and 14 is extremely low.

The pressure transmitters 17, 18 on the respective chambers 7, 10 serve primarily to adjust the throttle effect of the valves 13 and 14 during their opening to the best possible setting as a function of the respective pressure difference between the chambers 7, 10. Furthermore, it is also possible with these pressure transmitters 17, 18 to check whether the non-return valves 11, 12 are working correctly when the respective proportional valves 13 and 14 arranged in series with these are opened.

Figure 2:
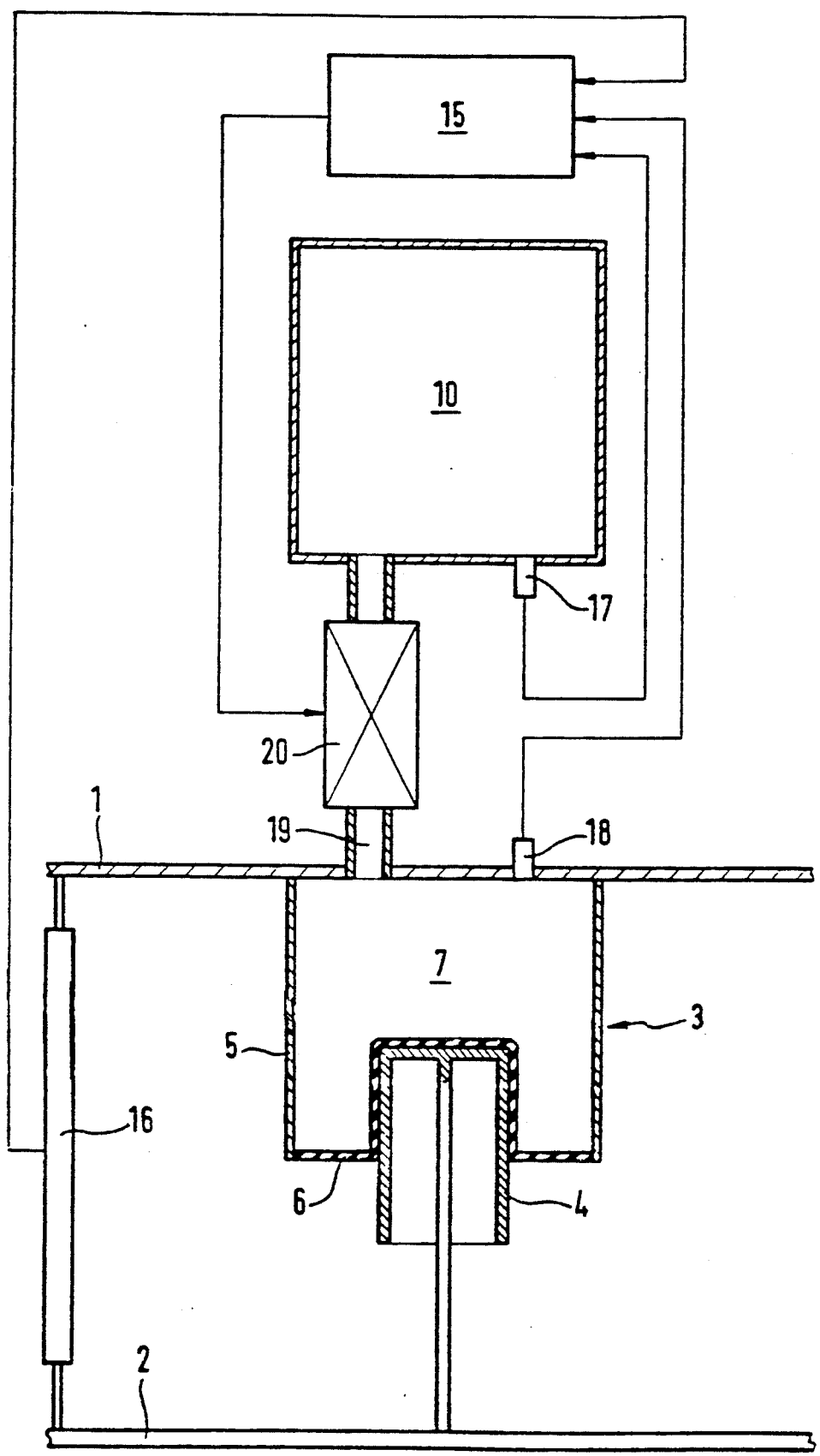
FIG. 2 is a schematic elevational view of a second embodiment of the present invention.

The other embodiment illustrated in FIG. 2 differs from that according to FIG. 1 essentially in that, between the chambers 7, 10, only a single line 19, is controlled by an adjustable proportional valve 20 which makes it possible to isolate the chambers 7, 10 completely from one another or to connect them to one another with greater or lesser throttling or virtually free of throttling. In principle, the same operating mode as in the arrangement of FIG. 1 can be obtained with the arrangement of FIG. 2, if the proportional valve 20 is controlled accordingly as a function of the pressure differences between the chambers 7, 10. Thus, in the above-described operating modes of the embodiment shown in FIG. 1, when pneumatic medium is exchanged between the chambers 7 and 10, the proportional valve 20 of the embodiment illustrated in FIG. 2 has to be opened each time. As soon as, in the embodiment according to FIG. 1, an exchange of pneumatic medium between the chambers 7, 10 is prevented by one of the non-return valves 11 and 12 or as a result of the closing of the particular associated proportional valve 13 or 14, in the embodiment according to FIG. 2 the proportional valve 20 has to be closed.

In the embodiment according to FIG. 1, comparatively slowly controllable proportional valves 13, 14 can be used because the non-return valves 11, 12 conventionally work with very low inertia. In the embodiment according to FIG. 2, it should be possible for the proportional valve 20 to be changed over quickly.

In contrast to the embodiments illustrated, if appropriate, hydropneumatic spring units can also be provided. These differ from the purely pneumatic spring units 3 shown in FIGS. 1 and 2 essentially only in that the displacement piston 4 is arranged as part of a hydraulic displacement unit which is itself coupled hydraulically to the concertina 6 so that the volume of the chamber 7 is once again increased and reduced according to the stroke movements of the displacement piston 4. In principle, there is no change in the operating mode. The hydraulic flows brought about by the displacement piston 4 during its strokes can, however, be guided via more or less highly active throttle stages, in order thereby to achieve an additional hydraulic damping of the piston strokes.

It is possible, moreover, to arrange active pump units between the chambers 7 and 10 to provide, where appropriate, the possibility of increasing a pressure drop between the chambers 7 and 10 or, with small pressure differences between the chambers 7 and 10, of reducing it and/or reversing it especially quickly.

Although power is required for driving the pumps, the power consumption nevertheless remains relatively low because the pressure difference between the chambers 7, 10 can already be varied markedly via displacement of a relatively small amount of pneumatic medium between the chambers 7, 10.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A motor vehicle spring support system, comprising one of pneumatic spring elements and hydropneumatic spring elements operatively arranged between a sprung mass and a non-sprung mass and configured as displacement units, each unit possessing a valve arrangement, a first pneumatic chamber, having a volume which changes according to the respective spring stroke, a second pneumatic chamber, having a constant volume and controllably operatively but isolatedly connected to the first chamber by the valve arrangement as a function of the stroke position of the respective spring element, and a computer-assisted control operatively connected with each unit, wherein the computer assisted control is configured to determine from the signals of a stroke transmitter arranged between the sprung mass and non-sprung mass the respective stroke position, stroke speed, stroke direction, and stroke frequency, and to detect undesirable movements, in a range including the range of a body resonant frequency of said vehicle, for changing over the valve arrangement between an open position and a closed position at every reversal of stroke direction at times such movements occur so as to counteract such movements.

2. The support systems according to claim 1, wherein, in a closed state of the valve arrangement, a throttled connection remains between the chambers, and the throttle resistances can be sized differently for the extension stage and the compression stage of the spring element.

3. The support system according to claim 1, wherein, to eliminate undesirable movements of the sprung mass, the valve arrangement is one of closed or switched in the compression stage that only a flow from the constant-volume chamber to the variable-volume chamber is permitted, and, at the reversal point between the compression stage and extension stage, the valve arrangement is one of opened or switched into a state in which a flow from the variable-volume chamber in the direction of the constant-volume chamber can occur.

4. The support system according to claim 3, wherein, in a closed state of the valve arrangement, a throttled connection remains between the chambers, and the throttle resistances can be sized differently for the extension stage and the compression stage of the spring element.

5. The support system according to claim 1, wherein, to eliminate undesirable movements of the sprung mass, the valve arrangement is configured to be one of closed or switched in the extension stage that only a flow from the variable-volume chamber in the direction of the constant-volume chamber can occur, and, at the reversal point between the extension stage and compression stage, the valve arrangement is configured to be one of opened or switched into a state in which a flow from the constant-volume chamber in the direction of the variable-volume chamber can occur.

6. The support system according to claim 5, wherein, in a closed state of the valve arrangement, a throttled connection remains between the chambers, and the throttle resistances can be sized differently for the extension stage and the compression stage of the spring element.

7. The support system according to claim 6, wherein, to eliminate undesirable movements of the sprung mass, the valve arrangement is one of closed or switched in the compression stage that only a flow from the constant-volume chamber to the variable-volume chamber is permitted, and, at the reversal point between the compression stage and extension stage, the valve arrangement is one of opened or switched into a state in which a flow from the variable-volume chamber in the direction of the constant-volume chamber can occur.

8. The support system according to claim 1, wherein, to increase one of an average volume of the variable-volume chamber and an average ground clearance of the sprung mass, the valve arrangement is configured to be opened in the extension stage when there is overpressure within the constant-volume chamber in relation to the variable-volume chamber and closed at the reversal point between the extension stage and compression stage.

9. The support system according to claim 8, wherein, in a closed state of the valve arrangement, a throttled connection remains between the chambers, and the throttle resistances can be sized differently for the extension stage and the compression stage of the spring element.

10. The support system according to claim 9, wherein, to eliminate undesirable movements of the sprung mass, the valve arrangement is one of closed or switched in the compression stage that only a flow from the constant-volume chamber to the variable-volume chamber is permitted, and, at the reversal point between the compression stage and extension stage, the valve arrangement is one of opened or switched into a state in which a flow from the variable-volume chamber in the direction of the constant-volume chamber can occur.

11. The support system according to claim 10, wherein, to eliminate undesirable movements of the sprung mass, the valve arrangement is configured to be one of closed or switched in the extension stage that only a flow from the variable-volume chamber in the direction of the constant-volume chamber can occur, and, at the reversal point between the extension stage and compression stage, the valve arrangement is configured to be one of opened or switched into a state in which a flow from the constant-volume chamber in the direction of the variable-volume chamber can occur.

12. The support system according to claim 1, wherein, to reduce one of an average volume of the variable-volume chamber and an average ground clearance of the vehicle body, the valve arrangement is configured to be opened in the compression stage when there is overpressure in the variable-volume chamber in relation to the constant-volume chamber and closed at the reversal point between the compression stage and extension stage.

13. The support system according to claim 12, wherein, in a closed state of the valve arrangement, a throttled connection remains between the chambers, and the throttle resistances can be sized differently for the extension stage and the compression stage of the spring element.

14. The support system according to claim 13, wherein, to eliminate undesirable movements of the sprung mass, the valve arrangement is one of closed or switched in the compression stage that only a flow from the constant-volume chamber to the variable-volume chamber is permitted, and, at the reversal point between the compression stage and extension stage, the valve arrangement is one of opened or switched into a state in which a flow from the variable-volume chamber in the direction of the constant-volume chamber can occur.

15. The support system according to claim 14, wherein, to eliminate undesirable movements of the sprung mass, the valve arrangement is configured to be one of closed or switched in the extension stage that only a flow from the variable-volume chamber in the direction of the constant-volume chamber can occur, and, at the reversal point between the extension stage and compression stage, the valve arrangement is configured to be one of opened or switched into a state in which a flow from the constant-volume chamber in the direction of the variable-volume chamber can occur.

16. The support system according to claim 15, wherein, to increase one of an average volume of the variable-volume chamber and an average ground clearance of the sprung mass, the valve arrangement is configured to be opened in the extension stage when there is overpressure within the constant-volume chamber in relation to the variable-volume chamber and closed at the reversal point between the extension stage and compression stage.

17. The support system according to claim 1, wherein, the valve arrangement comprises two non-return valves configured to open in opposite directions, and respective proportional valves arranged in series therewith and configured to be changed over between a closed state and an opened state.

18. The support system according to claim 1, wherein, the valve arrangement comprises a controllable proportional valve configured to be changed over between a relatively unthrottled open position and one of a complete and sharply throttled closing position.

19. The support system according to claim 1, wherein, a pump is operatively arranged between the variable-volume chamber and the constant volume chamber for displacing pneumatic medium between the chambers.

* * * * *